United States Patent [19]

Palmer et al.

[11] 4,410,577

[45] Oct. 18, 1983

[54] WOVEN LAYERED CLOTH REINFORCEMENT FOR STRUCTURAL COMPONENTS

[75] Inventors: Raymond J. Palmer, Newport Beach, Calif.; Dominique Micheaux, Villette d'Anthon, France

[73] Assignee: McDonnell Douglas Corporation, Long Beach, Calif.

[21] Appl. No.: 337,994

[22] Filed: Jan. 8, 1982

[30] Foreign Application Priority Data

Jan. 12, 1981 [FR] France .................................. 81 00499

[51] Int. Cl.³ .............................................. B32B 3/02
[52] U.S. Cl. ...................................... 428/85; 112/405;
112/410; 112/440; 428/102; 428/246; 428/251;
428/257; 428/252; 428/259; 428/408; 428/902;
428/910

[58] Field of Search ................. 428/85, 102, 246, 251,
428/252, 257, 258, 259, 902, 910, 408; 112/405,
410, 440, 441

[56] References Cited

U.S. PATENT DOCUMENTS

| | | | |
|---|---|---|---|
| 3,991,248 | 11/1976 | Bauer | 428/260 |
| 4,059,468 | 11/1977 | Bouillion | 428/368 |
| 4,103,055 | 7/1978 | Levy | 428/259 |
| 4,237,175 | 12/1980 | Hobayashi | 428/246 |
| 4,368,234 | 1/1983 | Palmer et al. | 428/257 |

*Primary Examiner*—James J. Bell
*Attorney, Agent, or Firm*—Max Geldin

[57] ABSTRACT

Individual plies of woven cloth having different fiber orientation patterns are prelocated with respect to each other and by continuous means, such plies are arranged into a stacked package and sewn together to secure the plies in a predetermined position with respect to each other.

26 Claims, 12 Drawing Figures

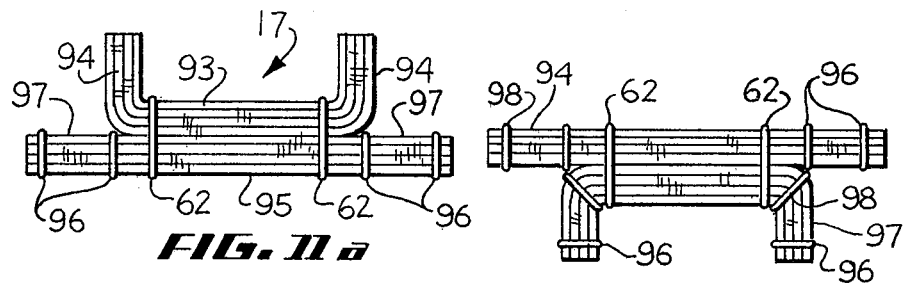
FIG. 11a
FIG. 11b
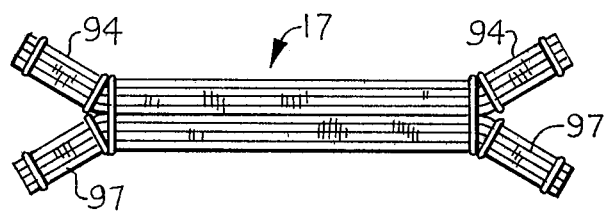
FIG. 11c
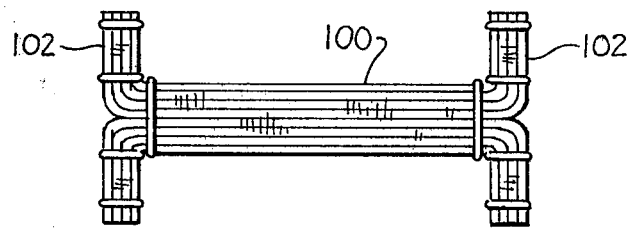
FIG. 11d
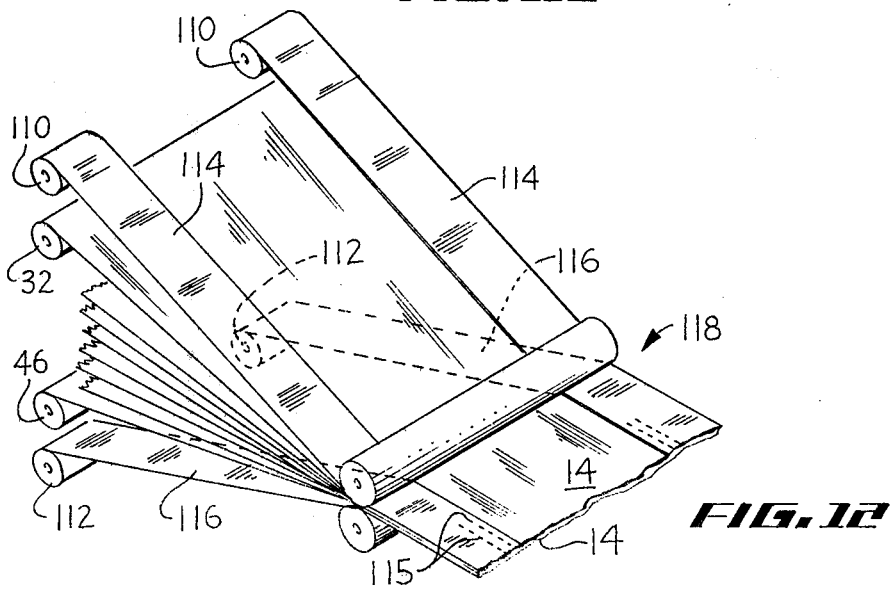
FIG. 12

WOVEN LAYERED CLOTH REINFORCEMENT FOR STRUCTURAL COMPONENTS

BACKGROUND OF THE INVENTION

This invention relates to the production of woven sewn fiber reinforcements for structural components, and is particularly concerned with procedure for continuously producing an assembly of layers of plies of woven cloth having different fiber orientation patterns, and securing the plies together in a predetermined position with respect to each other.

Most structural type composite parts are made from multiple plies or layers of "B" stage resin impregnated woven cloth or unidirectional type fiber (graphite, boron, Kevlar, fiberglass or mixtures of such materials). The plies are laid in place one layer at a time until the total number of plies have been positioned to a prescribed fiber ply orientation pattern. This layered assembly is then cured under heat and pressure by conventional processes dependent on the resin system in use. These fiber reinforced resin or plastic components have numerous applications, particularly as structural components in airplanes, ships and automobiles.

However, the individual ply-by-ply layup time for assembling a required fiber pattern is time-consuming and expensive, and further is subject to human error in fiber ply count and fiber ply orientation.

Many prior art patents disclose the production of various forms of woven and unwoven materials or cloths which are impregnated with resin. Many of the resin impregnated structures so produced, however, are not designed for use as high strength structural components, but are employed in other applications, for example as acoustic materials.

Thus, for example, U.S. Pat. No. 3,481,427 describes a three dimensional woven fiberglass fabric which, when impregnated with resin and cured, gives a rigid porous panel structure for acoustic requirements. A sandwich with porous skin on one side and solid skin on the other side, and connecting fluted webs, can be woven at once. The weaving is in the form of an over-/under pattern that is not optimized for strength but for sound absorption.

U.S. Pat. No. 3,700,067 describes a three dimensional woven porous sheet formed from an integrally woven fiber which, when impregnated with a low flow resin and cured, gives a rigid yet porous panel. Its intended use is sound absorption.

It is an object of the present invention to provide a woven sewn fiber reinforcement as an integral assembly, which can be impregnated with resin and employed as a structural component. Another object of the invention is to provide procedure for laying up a plurality of layers or plies of woven cloth having different orientation patterns, and securing the plies together in a predetermined position with respect to each other. Yet another object is the provision of procedure for continuously arranging a plurality of layers or plies of woven fiber reinforcement cloth, and continuously securing together the respective layers or plies to form a unitary woven reinforcement having high modulus and high strength. A still further object of the invention is to carry out the above noted procedure for producing an integral woven reinforcement by inexpensive and simple operations.

SUMMARY OF THE INVENTION

The above objects are achieved according to the invention by the provision of a process for producing a woven sewn layered cloth reinforcement for structural components, which comprises (a) providing a plurality of plies of woven cloth, said plies having different orientation patterns, (b) prelocating said plies in spaced relation to each other, (c) placing said plies in contact with each other in a predetermined arrangement or stacking sequence, and (d) securing the plies together to form a unitary assembly of plies in stacked relation.

The securing of the plies together can be carried out preferably by sewing or stitching, but other means such as stapling or tufting can be used.

Thus, for example, three forms of non-crimp woven material in specific fiber orientation can be provided. These can include unidirectional cloth woven with high modulus, high strength fibers such as graphite or boron fibers (1) mainly in the 0° (warp) direction, in one pattern arrangement, (2) mainly in the 45° to warp direction in another pattern arrangement, and (3) mainly in the 90° to warp (or fill) direction in a third pattern arrangement, using loose tie yarn in the warp or fill direction in the respective woven cloth patterns noted above to fasten the cloth into a soft drapeable condition which will also hold the highly oriented fibers in position. The high modulus fiber orientation is not limited to the 0°, 45° and 90° directions, and, for example, 30° high modulus ply orientation can be made with equal ease.

The above unidirectional woven cloth materials are then layered on top of each other in a predetermined stacked relation to produce the desired fiber pattern arrangement in the assembly, and the layers of the assembly are then sewn or stitched together to form a secure layered cloth material.

The woven sewn material can then be impregnated in a mold, e.g., with "B" stage epoxy resin, and stored on rolls ready for assembly on a mold and final curing of the resin to provide a desired structural composite or part.

Alternatively, the sewn layered woven reinforcement assembly can be positioned on the mold or tool surface in a dried unimpregnated condition, and can then be impregnated in place using a resin such as a thermosetting epoxy resin, and the assembly cured in the well known manner to provide the final structural composite or part.

The advantages of the invention include the simplicity of formation of the integral woven layered reinforcement, and reducing manufacturing costs by elimination of the necessity for individual ply-by-ply layup. The invention process for assembling a plurality of plies to the full thickness requirement and sewing the assembly for use as a reinforcement of a plastic or resin part minimizes the chance for human error when assembling a plurality of plies for producing fiber reinforcement assemblies, as a result of improper ply count or wrong fiber orientation. The entire woven and sewn assembly, regardless of shape, can be cut to size readily and laid on the tool as a complete assembly, and the integral woven sewn high strength/stiffness assembly of multi-ply thickness can be impregnated with resin at one time. This reduces impregnation costs compared to impregnation of multiple individual sheets of material prior to ply-by-ply layup.

THE DRAWINGS

The invention will be more fully described hereinafter in connection with the accompanying drawings, wherein:

FIGS. 11a, 11b, 11c and 11d illustrate the steps in the formation of a woven reinforcement in the shape of an I-beam, from the oriented layered cloth reinforcement produced in FIG. 1 and illustrated in FIG. 10;

FIG. 12 is a modification of FIG. 1, showing production of a layered cloth reinforcement having additional reinforcement strips attached to the multilayered assembly.

DETAILED DESCRIPTION OF EMBODIMENTS OF THE INVENTION

Referring to FIGS. 1 to 4 of the drawings, numeral 13 illustrates a device or machine for carrying out the invention process for producing a woven layered material indicated at 15, containing woven layers of cloth having different fiber orientation patterns and arrangement in a predetermined sequence, and which are sewn together to form a unitary or single piece of woven fiber reinforcement at 17.

In the present embodiment a particular final design of layered material 15 is desired requiring 8 plies of woven fiber material. Such 8 ply assembly is to be comprised of individual woven layers of material having the three patterns illustrated at 14, 16 and 18 in FIGS. 2, 3, and 4, respectively, and stitched together to form the sewn layered assembly 17 illustrated in FIG. 10.

Figure 1:
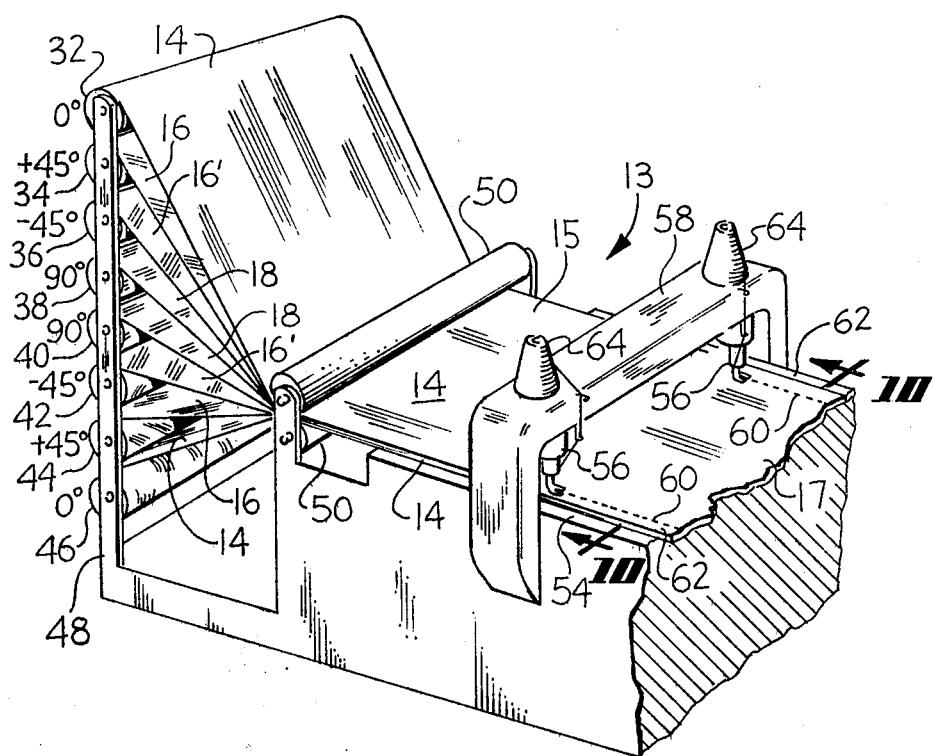
FIG. 1 is a prospective view of a machine for continuously feeding and arranging layers of woven material having different fiber orientation patterns, in a predetermined stacked relation, and sewing the layers together to form a unitary layered cloth reinforcement.
Figure 2:
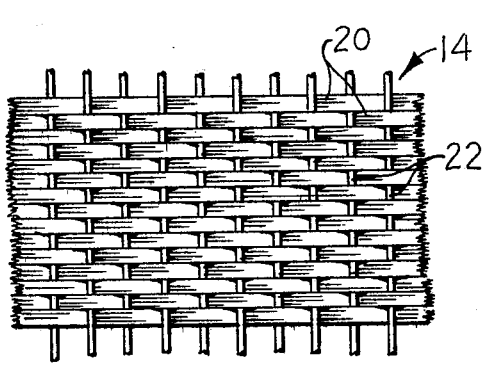
FIG. 2 illustrates one pattern of woven material used to form the layered assembly in FIG. 1 containing high modulus fibers mainly in the 0° warp direction.

Referring to FIG. 2, the woven cloth material 14 is comprised mainly of high strength/high modulus fibers 20 extending in a 0° warp direction, constituting approximately 95% of the total fiber content. Such warp fibers are preferably high modulus fibers such as graphite or boron fibers, but also can be low modulus fiberglass or organic fibers such as Kevlar, understood as comprised of poly (paraphenyl terephthalamide), or Dacron (understood as a polyester made from polyethylene terephthalate). The cloth 14 is woven in the 90° (fill) direction by a loose fiberglass or organic fiber, e.g., Kevlar or Dacron, tie yarn 22, functioning as linking fibers to secure the 0° warp fibers in position.

Figure 3:
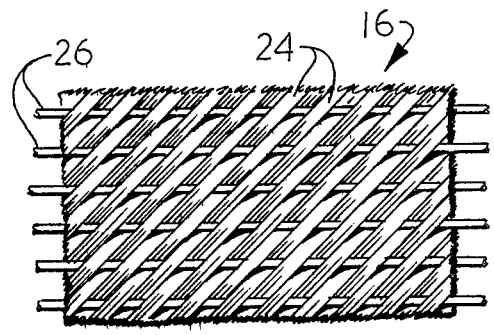
FIG. 3 illustrates another pattern of woven material used to form the layered assembly of FIG. 1, containing high modulus fibers mainly in the 45° to warp direction.

In FIG. 3 the woven material 16 is comprised of unidirectional high modulus fibers such as graphite fibers 24 extending in the 45° direction, and constituting approximately 95% of the total fiber content. The cloth 16 is woven in the 0° or warp direction by the loose non-crimp weave of fiberglass or organic fiber tie yarn, indicated at 26, to secure the 45° high modulus/high strength fibers in position.

Figure 4:
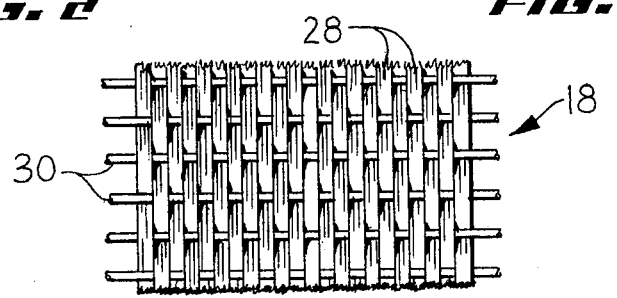
FIG. 4 illustrates a third pattern of woven material used to form the layered assembly of FIG. 1, containing high modulus fibers mainly in the 90° to warp (fill) direction.

In FIG. 4, the woven cloth 18 is comprised of unidirectional high strength/high modulus fibers such as graphite extending in the 90° to warp direction, actually the fill fibers 28, constituting approximately 95% of the total fiber content. Such fibers are woven together in the 0° (warp) direction by a loose non-crimp weave of fiberglass or organic fiber tie yarns 30 to secure the 90° high strength/high modulus, e.g., graphite, fibers in position.

Referring again to FIG. 1 for producing an 8 ply layered assembly according to the invention, 8 rolls 32, 34, 36, 38, 40, 42, 44 and 46, of unidirectional woven materials of the type illustrated in FIGS. 2, 3 and 4, are located on a rack 48 of the machine 13, one above the other. The rolls are positioned so as to produce a final layered material 15 having a fiber skin pattern comprised of successive layers of woven materials wherein the high modulus fibers in each of the respective 8 layers have the orientation 0°, +45°, −45°, 90°, 90°, −45°, +45°, 0°. For this purpose, the top and bottom rolls 32 and 46 are comprised of the 0° woven material 14 of FIG. 2; rolls 34 and 44 are comprised of the +45° woven material 16 of FIG. 3; and rolls 38 and 40 are comprised of the 90° woven material 18 of FIG. 3. The rolls 36 and 42 are comprised also of 45° material similar to the woven material 16 of FIG. 3, but with the high modulus fibers 24 oriented in the −45° direction, instead of the +45° direction. Such −45° woven material is indicated at 16'.

The woven cloths 14, 16, 16' and 18, on the 8 rolls 32-46, and in the prearranged sequence of patterns noted above and fed from their respective rolls, are drawn together through a locating and positioning set of rolls 50 on the machine 10 and pressed against each other to form the stacked sequence or arrangement 15 of the 8 individual plies of woven cloth fed from the above noted 8 rolls. The layered material 15 is then drawn along the base 54 of the machine by suitable means such as a drive roll (not shown) on which the final layered material is wound, e.g., for storage. As the layered material 15 proceeds to move in the direction to the right viewing FIG. 1, the layered material passes under a number of sewing machines. Two sewing machine heads 56 mounted on an overhead support member 58 are shown for clarity. However, a sufficient number of sewing heads are generally employed depending upon the number of stitches desired to secure the layered assembly together, with spacing between stitches as required by the mechanical and handling requirements of the sewn cloth. The sewing machine heads 56 sew a loose stitch indicated at 60 through the entire thickness of the layered material 15, in the 0° (warp) direction parallel to opposite edges 62 of the layered material 15. Such sewing or stitching is accomplished using fine fiberglass or organic fiber tie yarn, such as Kevlar or Dacron which is fed from the spools 64, on support member 58, to the sewing machine heads 56. The final layered and sewn assembly is illustrated at 17 in FIG. 10.

The spacing of the tie yarn such as 60 and the type of sewing stitch can be varied to obtain the desired feel, drape and secureness in the final layered and sewn assembly 17. Thus, varying types of sewing stitches and spacing for the tie yarns are illustrated in FIGS. 5 to 9 of the drawing.

Figure 5:
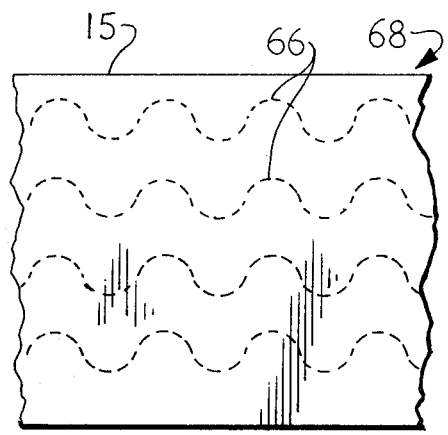
FIGS. 5 to 9 illustrate various stitching patterns which can be used to stitch the layered assembly together, such stitching patterns extending lengthwise; that is, in the 0° warp direction.

Referring to FIG. 5, the stacked assembly 15 can be sewn together by a plurality of spaced sinuous stitches 66 generally extending in the 0° (warp) direction, using a plurality of sewing heads, to form the final woven and sewn layered assembly 68.

Figure 6:
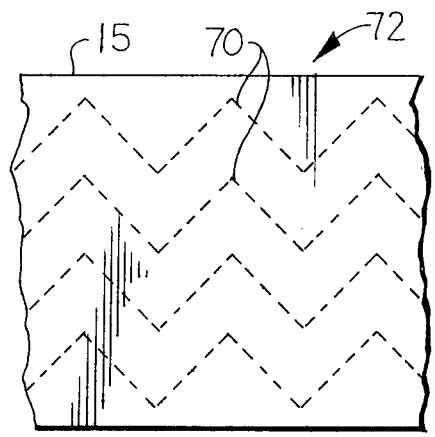

In FIG. 6, the stacked sequence of woven layers 15 in prearrangement order of fiber patterns for the respective layers can be sewn together by a plurality of spaced V-shaped stitches 70, generally extending in the 0° warp direction, to form the final woven and sewn layered material 72.

Figure 7:
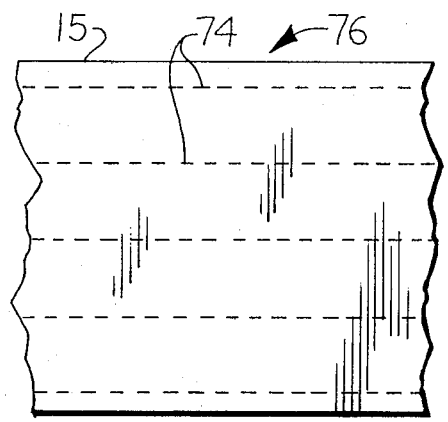

In FIG. 7, the layered material 15 can be sewn together by a plurality of spaced straight line stitches 74, all extending in the 0° (warp) direction, using a plurality of sewing heads to form the final woven and layered assembly 76.

Figure 8:
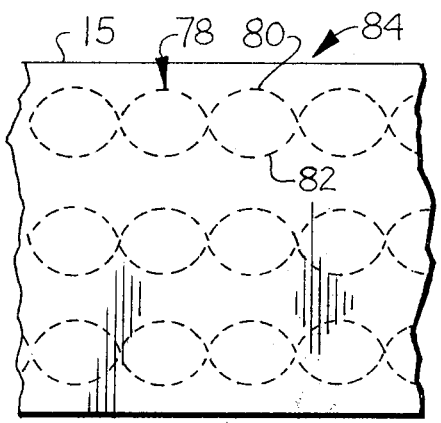

In FIG. 8, the layered material 15 can be stitched together by spaced double stitched patterns 78, extending generally in the 0° (warp) direction. Each of the stitching patterns 78 is comprised of two oppositely extending and intersecting sinuous stitches 80 and 82, and forming the final woven and stitched layered material 84.

Figure 9:
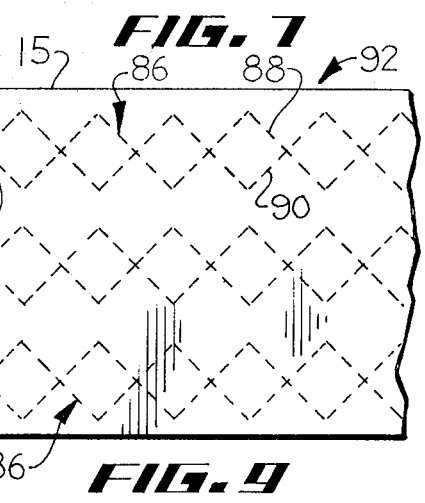

In FIG. 9, the stacked layered material 15 is stitched together by a plurality of spaced V-shaped stitching patterns 86 formed of loose tie yarns extending in a general 0° (warp) direction. Each of the V-shaped patterns is comprised of two V-shaped stitches 88 and 90 which intersect and extend in opposite directions, and forming the finally woven and stitched layered woven reinforcement 92.

In each of the embodiments of FIGS. 5 to 9, the sewing or stitching is accomplished using low modulus fiberglass or organic tie yarn.

An example of high modulus fibers which can be employed in the woven layers according to the invention are the graphite fibers Thornel 300, each fiber or thread containing 3,000 filaments. An example of low modulus tie yarn is E-glass having a twist of 80 revolutions per meter.

The thickness of the woven layered assembly produced according to the invention can range from about 0.012" to about 0.60 inch (about 2 to about 100 plies). However, thicker multilayered assemblies, e.g., up to about 1.20" (about 200 plies) can be produced according to the invention.

Figure 10:
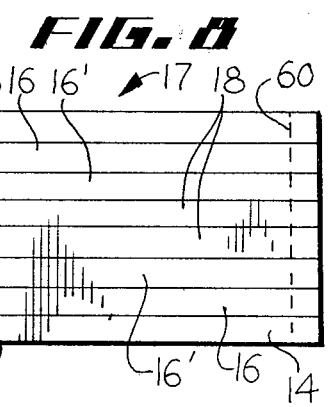
FIG. 10 shows a cross section of the layered cloth reinforcement produced according to the process illustrated in FIG. 1, taken on line 10—10 of FIG. 1, and which can be impregnated with a resin.

The sewn and woven layered assembly, such as 17, 68, 72, 76, 84, or 92, as shown in FIG. 10, in the form of a flat sheet can be impregnated with a suitable resin, e.g., a "B" stage epoxy resin, and can be stored on rolls ready for part fabrication. The material can then be placed in a suitable tool or mold and final curing then can be carried out by a procedure known in the art employing suitable heat/pressure/time processing techniques. For this purpose thermosetting resins such as epoxy, polyester and polyimide resins can be employed, the curing pressures and temperatures being dependent upon the particular resin employed. Thus, in the case of an epoxy resin, final curing temperature can range from about 250° F. to 350° F. at pressures of about 50 to about 100 psi, the curing time ranging from about 2 to about 8 hours, depending upon the curing temperature.

It will be noted that alternatively each individual roll of woven material, such as 14, can be impregnated with a suitable resin, e.g., a "B" stage epoxy resin, prior to the stacking and sewing steps described above and illustrated in FIG. 1 of the drawing. Following the stacking and sewing steps, the unitary layered material can then be stored, and finally cured as noted above.

The final sewn material, whether impregnated prior to or after sewing, will develop the same good mechanical and handling properties. However, impregnation of the stacked and layered material following sewing is preferred and is more economical.

The woven and sewn assemblies of layers of woven cloth in a predetermined stacking sequence according to the invention can be used to form structural parts by resin impregnation, where light weight, high strength and stiffness structural properties are required. Thus, such woven assemblies can be employed as reinforcement for plastic and resin structural parts in the aircraft, automotive, missiles and space, railroad, shipping and marine industries.

An illustrative specific type of woven reinforcement which can be formed from this woven and stitched layered assembly, e.g., 17, produced according to the invention, can be in the shape of an I-beam. Thus, referring to FIGS. 11a to 11d of the drawing, in FIG. 11a, the end portions of the upper 4 layers of the 8 ply assembly, indicated at 93, beyond the stitches 62, are separated from the lower 4 layers, indicated at 95, and are turned upwardly as indicated at 94. The end portions 97 of the lower 4 layers are then sewn or stitched together by stitches 96, beyond the stitches 62.

As seen in FIG. 11b, end portions 97 are turned down and the straight ends 94 beyond stitches 62 are sewn together as indicated at 98.

Referring to FIG. 11c, the stitched assembly of FIG. 11b is then formed into a double Y-shaped woven cloth structure, with the adjacent end portions 94 and 97 at opposite ends extending outwardly from each other.

Referring to FIG. 11d, the end portions 94 and 97 of the woven and stitched assembly are folded outwardly to form the I-beam configuration having a central portion or web 100 and opposite end flanges 102.

It will be understood that woven materials having other fiber orientations than those illustrated in FIGS. 2 to 4 can be used, e.g., a woven cloth having high modulus, e.g., graphite, fibers extending in a 30° to warp direction, and woven in the 0° or warp direction with a loose weave of fiberglass or organic fiber tie yarn. Further, various sequences of layers of different orientation patterns can be employed, other than the sequence illustrated in FIG. 1. For example, the layered assembly can consist of any number of layers containing high modulus fibers such as graphite fibers in only the 0° direction and in the 45° direction, respectively, corresponding to the woven materials of FIGS. 2 and 3, or in only the +45° and −45° directions, or in only the 0° and 30°, or in only the 0° and 90° directions, or any mixture of such woven materials.

Further, the layered assembly produced according to the invention need not have a uniform thickness throughout the assembly. Thus, reinforcement strips can be incorporated in the reinforcement structure, having a width or area less than the width or area of the cloth layers, to produce a layered assembly of non-uniform thickness and having added reinforcement strength in those areas where such strips are applied.

Thus, referring to FIG. 12, a pair of small rolls 110 of unidirectional 0° woven material of the type illustrated in FIG. 2 can be positioned above roll 32, and another pair of similar small rolls 112 of the same 0° woven material can be positioned below roll 46, and two narrow strips 114 of 0° woven cloth can be rolled from rolls 110, and two narrow strips 116 of 0° woven cloth can be rolled from rolls 112, simultaneously with the rolling of the sequence of wide layers of cloth being rolled from the other rolls. The result is that two narrow strips 114 can be attached by stitching as described above, and indicated at 115, to the upper cloth layer 14 of the assembly of cloth layers, adjacent the outer edges thereof, and two narrow strips 116 can be attached by similar stitching to the bottom cloth layer 14 of the assembly, adjacent the outer edges thereof, to form the sewn layered assembly 118.

Figure 12A:
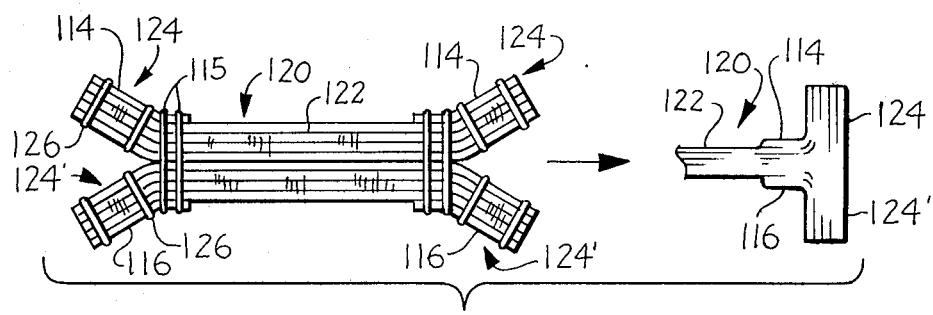
FIG. 12a shows the formation of an I-beam reinforcement member from the multilayer assembly of FIG. 12.

The layered assembly 118 of FIG. 12 can be used to make an I-beam reinforcement member as illustrated in FIG. 12a, and indicated at 120, similar to the I-beam reinforcement shown in FIG. 11c, having a web 122 and flanges 124 and 124' at opposite ends of the web, and wherein the flanges 124 and 124' are reinforced by the cloth strips 114 and 116, respectively, which are additionally stitched at 126 to such flanges. The flanges 124 and 124' at each end of the I-beam reinforcement are then folded outwardly to form the I-beam configuration, as shown in the figure at the right in FIG. 12a.

Such I-beam reinforcement member can be impregnated with a suitable resin, e.g., a "B" stage epoxy resin, placed in a suitable tool, and the assembly cured in a conventional manner.

From the foregoing, it is seen that the invention provides a unitary multi-ply woven fiber reinforcement of high strength formed of multiple sheets of woven material having different fiber patterns which are oriented and stacked in a predetermined sequence, and which can be sewn, stitched, stapled or tufted to form a multi-layered material that can be handled readily as a single piece. Such woven and secured layered materials can be produced by a single continuous process, and avoiding the tedious and expensive prior art procedure for providing such woven reinforcements, involving the laying up of individual layers or plies of "B" stage resin impregnated woven material on a tool with the proper fiber ply orientation pattern, followed by a conventional time/pressure curing cycle.

While particular embodiments of the invention have been described for purposes of illustration, it will be understood that various changes and modifications within the spirit of the invention can be made, and the invention is not to be taken as limited except by the scope of the appended claims.

What is claimed is:

1. A process for producing a woven layered cloth reinforcement for structural components, which comprises
   (a) providing a plurality of plies of woven cloth, said plies having different orientation patterns,
   (b) prelocating said plies in spaced relation to each other,
   (c) placing said plies in contact with each other in a predetermined stacking sequence, and
   (d) securing the plies together to form a unitary drapeable assembly of plies in stacked relation, said securing said plies together being carried out by sewing, stitching, stapling or tufting said plies together.

2. The process as defined in claim 1, said securing said plies together being carried out by sewing.

3. The process as defined in claim 1, said plies each formed chiefly of high modulus fibers with loose tie yarn woven in a direction to secure the high modulus fibers in position.

4. The process as defined in claim 1, said plies each formed chiefly of graphite, boron, fiberglass or organic fibers, with loose fiberglass or organic tie yarn to secure said fibers together.

5. The process as defined in claim 1, said plurality of plies including at least one ply having high modulus fibers chiefly in the 0° warp direction with loose tie yarn woven in the fill direction, at least one ply having high modulus fibers chiefly in the 45° to warp direction with loose tie yarn woven in the warp direction, and at least one ply having high modulus fibers chiefly in the 90° fill direction with loose tie yarn woven in the warp direction.

6. The process as defined in claim 5, wherein said high modulus fibers are graphite or boron fibers and said tie yarn is fiberglass or organic fiber.

7. The process as defined in claim 5, said plies being secured together by sewing in the warp direction, using straight line parallel stitching.

8. The process as defined in claim 5, said plies being secured together by sewing generally in the warp direction, using parallel sinuous stitching.

9. The process as defined in claim 5, said plies being secured together by sewing generally in the warp direction, using V-shaped parallel stitching.

10. The process as defined in claim 1, including impregnating said unitary assembly of plies with a "B" stage thermosetting resin and curing said resin.

11. A continuous process for producing a woven layered cloth reinforcement for structural components which comprises
    (a) providing a plurality of rolls of woven cloth, at least some of said rolls of cloth having different orientation patterns,
    (b) positioning said rolls to provide a predetermined sequence of a plurality of cloth layers one above the other from said rolls,
    (c) passing said woven cloth from each of said rolls, through locating and positioning rolls and pressing the layers of woven cloth passing through said rolls together in a stacked arrangement wherein said cloth layers are in a predetermined stacking sequence, and
    (d) sewing said layers of woven cloth in said stacked assembly together to form a unitary drapeable assembly of said woven cloth layers.

12. The process as defined in claim 11, said plurality of layers including at least one layer having high modulus fibers chiefly in the 0° warp direction with loose tie yarn woven in the fill direction, at least one layer having high modulus fibers chiefly in the 45° to warp direction with loose tie yarn woven in the warp direction, and at least one layer having high modulus fibers chiefly in the 90° fill direction with loose tie yarn woven in the warp direction.

13. The process as defined in claim 12, wherein said high modulus fibers are graphite or boron fibers and said tie yarn is fiberglass or Kevlar.

14. The process as defined in claim 11, said layers being secured together by sewing in the warp direction, using straight line parallel stitching.

15. The process as defined in claim 11, including impregnating said unitary assembly of layers with a "B" stage thermosetting resin and curing said resin.

16. The process as defined in claim 15, said "B" stage resin being a "B" stage epoxy resin, polyester resin or polyimide resin.

17. The process as defined in claim 11, at least some of said rolls of cloth and at least some of said cloth layers having a narrower width than other rolls of cloth and other cloth layers.

18. A unitary woven layered cloth reinforcement member which comprises a plurality of layers of woven cloth stacked in a predetermined sequence, said plurality including at least one layer having high modulus fibers chiefly in the 0° warp direction with loose tie yarn woven in the fill direction, at least one layer having high modulus fibers chiefly in the 45° to warp direction with loose tie yarn woven in the warp direction, and at least one layer having high modulus fibers chiefly in the 90° fill direction with loose tie yarn woven in the warp direction, said layers being secured together by sewing, stitching, stapling or tufting said layers together, to form a unitary drapeable assembly.

19. The woven cloth reinforcement as defined in claim 18, in the form of a flat sheet, said layers being secured together by sewing or stitching.

20. The woven cloth reinforcement as defined in claim 18, said layers being secured together by sewing in the warp direction, using straight line parallel stitching.

21. The woven cloth reinforcement as defined in claim 18, said layers being secured together by sewing generally in the warp direction, using a sinuous stitching pattern.

22. The woven cloth reinforcement as defined in claim 18, said layers being secured together by sewing generally in the warp direction, using V-shaped parallel stitching.

23. The woven cloth reinforcement as defined in claim 18, wherein said reinforcement member is in the shape of an I-beam, said I-beam having a web and a pair of flanges integrally attached to opposite ends of the web.

24. The woven cloth reinforcement as defined in claim 18, said unitary assembly being impregnated with a "B" stage thermosetting resin selected from the group consisting of epoxy, polyester and polyimide resins.

25. The woven cloth reinforcement as defined in claim 18, wherein at least one of said layers has an area less than the other layers, and providing a layered cloth reinforcement member of non-uniform thickness.

26. A unitary woven layered cloth reinforcement member which comprises a plurality of layers of woven cloth stacked in a predetermined sequence, each layer of woven cloth containing high modulus fibers in one direction with tie yarn woven in another direction to secure the high modulus fibers in position, said layers being secured together by sewing, stitching, stapling or tufting said layers together to form a unitary drapeable assembly.

* * * * *

UNITED STATES PATENT AND TRADEMARK OFFICE
CERTIFICATE OF CORRECTION

PATENT NO. : 4,410,577
DATED : October 18, 1983
INVENTOR(S) : Raymond J. Palmer et al.

It is certified that error appears in the above-identified patent and that said Letters Patent is hereby corrected as shown below:

On the title page, assignee should read:

-- McDonnell Douglas Corporation, Long Beach, Calif., and Brochier & Fils, Decines-Charpieu, France --.

Signed and Sealed this

Twenty-fourth Day of January 1984

[SEAL]

Attest:

GERALD J. MOSSINGHOFF

Attesting Officer

Commissioner of Patents and Trademarks